United States Patent
Maltzman (10) Patent No.: US 7,340,429 B2
(45) Date of Patent: Mar. 4, 2008

(54) METHOD AND SYSTEM TO ENABLE A FIXED PRICE PURCHASE WITHIN A ONLINE AUCTION ENVIRONMENT

(75) Inventor: Reed Maltzman, San Francisco, CA (US)

(73) Assignee: eBay Inc., San Jose, CA (US)

( * ) Notice: Subject to any disclaimer, the term of this patent is extended or adjusted under 35 U.S.C. 154(b) by 1308 days.

(21) Appl. No.: 09/820,574

(22) Filed: Mar. 28, 2001

(65) Prior Publication Data

US 2002/0107779 A1    Aug. 8, 2002

Related U.S. Application Data

(60) Provisional application No. 60/242,729, filed on Oct. 23, 2000.

(51) Int. Cl.
*G06Q 40/00*     (2006.01)

(52) U.S. Cl. ............................. 705/37; 705/35; 705/36; 705/26; 705/27; 705/28; 705/38; 705/40

(58) Field of Classification Search ................... 705/37, 705/26, 28
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymayer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |

(Continued)

FOREIGN PATENT DOCUMENTS

CA    2253543    3/1997

(Continued)

OTHER PUBLICATIONS

Hof, Robert D. and Linda Himelstein, eBay vs. Amazon.com, May 31, 1999, Business Week 3631, p. 128, 11 pages.*

(Continued)

*Primary Examiner*—Narayanswamy Subramanian
(74) *Attorney, Agent, or Firm*—Schwegman, Lundberg, & Woessner, P.A.

(57) ABSTRACT

A method of allowing a seller in an auction facility to offer buyers the option of buying an offering at a pre-auction seller determined price or using a regular auction process. If a buyer is given the option to purchase at the seller determined price and decides to use the regular auction process by submitting a bid, the option to buy the offering at a pre-auction seller determined price is discontinued.

20 Claims, 10 Drawing Sheets

U.S. PATENT DOCUMENTS

| | | |
|---|---|---|
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Aussubel |
| 5,922,074 A | 7/1999 | Richard et al. |
| 5,924,072 A | 7/1999 | Havens |
| 5,926,794 A | 7/1999 | Fethe |
| 5,974,412 A | 10/1999 | Hazlehurst et al. |
| 5,991,739 A | 11/1999 | Cupps et al. |
| 6,035,402 A | 3/2000 | Vaeth et al. |
| 6,044,363 A | 3/2000 | Mori et al. |
| 6,047,264 A | 4/2000 | Fisher et al. |
| 6,047,274 A * | 4/2000 | Johnson et al. ............. 705/412 |
| 6,055,518 A | 4/2000 | Franklin et al. |
| 6,058,417 A * | 5/2000 | Hess et al. ................. 709/219 |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 * | 3/2001 | Woolston ..................... 705/27 |
| 6,243,691 B1 | 6/2001 | Fisher et al. |
| 2006/0015436 A1 * | 1/2006 | Burns et al. .................. 705/37 |
| 2006/0259406 A1 * | 11/2006 | Kemp et al. .................. 705/37 |
| 2006/0259409 A1 * | 11/2006 | Burns et al. .................. 705/37 |
| 2006/0293994 A1 * | 12/2006 | Stuart .......................... 705/37 |

FOREIGN PATENT DOCUMENTS

| | | |
|---|---|---|
| FR | 2658635 A1 | 2/1991 |
| NL | 9300266 | 2/1993 |
| WO | WO92/15174 | 2/1992 |
| WO | WO95/17711 | 6/1995 |
| WO | WO96/34356 | 4/1996 |
| WO | WO97/37315 | 3/1997 |
| WO | WO99/63461 | 12/1999 |

OTHER PUBLICATIONS http://web.archive.org/web/*/http://www.ebay.com□□Date: Nov. 27, 1999□□Category: Toys, Bean Bag Plush: Action Figures: General, 3 pages.*

Malone, T.W.; Yates, J; et al., "Electronic Markets and Electronic Hierarchies", *Communications—of the ACM*, Jun. 1987, pp. 484-497, vol. 30, No. 6.

Warbelow, A; Kokuryo, J, "Aucent: TV Auction Network System". *Harvard Business School Case/Study*, Jul. 1989, pp. 1-15, HBVR# 9-190-001, USA.

"Personal Optimized Decision/Transaction Program", *IBM Technical Disclosure Bulletin*, Jan. 1995, pp. 83-84, vol. 38, No. 1.

Neo, B.S, "The implementation of an electronic market for pig trading in Singapore", *Journal of Strategic Information Systems*, Dec. 1992, pp. 278-288, vol. 1.

Rockoff, T.E; Groves, M., "Design of an Internet-based system for remote Dutch auctions", *Internet Research—Electronic Networking Applications and Policy*, Jan. 1, 1995, vol. 5, No. 4, pp. 10-16.

Massimb, M.N; Phelps, B.D, "Electronic Trading, Market Structure and Liquidity", *Financial Analysts Journal*, Jan.-Feb. 1994, vol. 50, No. 1, pp. 39-50.

Post, D.L; Coppinger, S.S, et al., "Application of Auctions as a Pricing Mechanism for the Interchange of Electric Power", *IEEE Transactions on Power Systems*, Aug. 1995, p. 7, vol. 10, No. 3.

Hess, C.M; Kemerer, C.F., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21.

"Anonymous Delivery of Goods in Electronic Commerce", *IBM Technical Disclosure Bulletin*, Mar. 1996, pp. 363-366, vol. 39, No. 3.

Lee, Ho G., "Electronic Brokerage and Electronic Auction: The Impact of IT on Market Structures", *Proceedings of the 29th HICSS*, 1996, pp. 397-406, vol. IV.

Clemons, E; Weber, B., "Evaluating the Prospects for Alternative Electronic Securities Markets", *International Conference on Information Systems*, 1991, pp. 53-61, vol. 12.

Mardesich, J., "Onsale takes auction gavel electronic", *Computer Reseller News*, Jul. 8, 1996, p. 2 continued on p. 32.

"Onsale joins fray as online shopping picks up speed: Internet Booms", *Computer Reseller News*, Jun. 5, 1995, p. 73 (www.dialogweb.com).

Siegmann, Ken, "Nowhere to go but up", *PC Week*, Oct. 23, 1995, pp. 1-3, vol. 12, No. 42 (www.dialogweb.com).

"Onsale: Onsale Brings Thrill of Auctions and Bargain Hunting Online; Unique Internet retail service debuts with week-long charity auction for the Computer Museum in Boston", May 24, 1995, (pp. 3) Dialog Web. 0489267 BW0022.

Schmid, B.F., "The Development of Electronic Commerce", *Newsletter of the Competence Centre Electronic Markets*, Oct. 1993, No. 9/10.

Tjostheim, I; Eide, J., "A case study of an on-line auction for the World Wide Web", Norwegian Computing Center, No Date Given, www/nr.no/gem/elcom/publikasjoner/enter98e.html.

Graham, I., "The Emergence of Linked Fish Markets in Europe", *Focus Theme*, No Date Given.

Reck, Martin, "Trading-Process Characteristics of Electronic Auctions", *Focus Theme*, No Date Given.

Van Heck, E.; Ribbers, P.M., "Experiences with Electronic Auctions in the Dutch Flower Industry", *Focus Theme*, No Date Given.

Lee, H.G., "AUCNET: Electronic Intermediary for Used-car Transactions", *Focus Theme*, No Date Given.

Klein, S., "Introduction to Electronic Auctions", *Focus Theme*, No Date Given.

Turban, E., "Auctions and Bidding on the Internet an Assessment", *Focus Theme*, No Date Given.

Zwass, Vladimir, "Electronic Commerce: Structures and Issues", *International Journal of Electronic Commerce*, Fall 1996, pp. 3-23, vol. 1, No. 1, pp. 3-23 (www.cba.bgsu.edu).

Priest, Chris; van Tol, Maarten, "Adaptive agents in a persistend shout double auction", Proceedings of the First International Conference on Information and Computation Economies, Oct. 25-281, 1998, Charleston, US.

Resnick, Paul; Zeckhauser, Richard; Friedman, Eric; Kuwabara, Ko, "Reputation Systems", Association for Computing Machinery, *Communications of the ACM*, vol. 43, No. 12, pp. 45-48 ((Dialog.

Meade, Jim, visual 360: a performance appraisal system that's "fun"., *HR Magazine*, Jul. 1999 (Dialog file).

International Search Report-PCT/US01/31012, Jan. 15, 2002.

Autodaq Creates Online Marketplace For Used Auto Industry, Business Wire, Jan. 17, 2000, entire document.

Ina Steiner, "From the Editor", Auction Bytes newsletter, Auctionbytes-Update, No. 8—Feb. 20, 2000—ISSN 1529-6703, 3 pages.

David Lucking-Reiley, "Auctions On The Internet: What's Being Auctioned, And How?", The Journal of Industrial Economics, Sep. 2000, vol. XLVIII, No. 3, pp.227-252.

Zoltan Hidvegi, et al., "Buy-price English Auction", Sep. 1, 2002, 28 pages.

Eric B. Budish and Lisa N. Takeyama, "Buy prices in online auctions: irrationality on the internet?", Economics Letters, 2001, pp. 325-333.

Stanley S. Reynolds and John Wooders, "Ascending Bid Auctions with a Buy-Now Price", Aug. 2002, 29 pages.

Timothy Mathews, "A Risk Averse Seller in a Continuous Time Auction with a Buyout Option", Sep. 12, 2002, 26 pages.

\* cited by examiner

Sell Your Item

*Related Links:* • New to Selling? • Seller Tips • Fees • Registration
• Free Shipping Estimates from iShip.com

- Your User ID: ______________
  You can also use your email address.

Your Password: ______________

Title required
(45 characters max; no HTML tags, asterisks, or quotes, as they interfere with Search) see tips

Category (Choose one category only; be as specific as possible.)
required
Antiques & Art: [▼]

Description required

513 —
Buy It Now  NEW!
Sell your item instantly to the first buyer who meets your specified price.

The Buy It Now price is only available before bids appear.
Learn more

Buy It Now - Special Holiday Promotion
Free during Holiday promotion
$ [____] Enter the Buy It Now price
e.g. 20.00 -- Please do not include commas or currency symbols, like $.

Buy It Now is not currently available for multiple item auctions.

We recommended Buy It Now with Instant Purchase through eBay Online Payments (available below.)

[_____] Search tips
☑ Search only in Collectibles
☐ Search titles and descriptions Updated: Oct 13, 2000
06:31:09
PDT

Related Topics: China & Pottery Theme Page | Dept 56 | Glass

1069 Bells items in All

| All Items | All items including Gallery preview | Gallery Items |

| Status | Featured Items - Current | Price | Bids | Ends PDT |
|---|---|---|---|---|

There are no featured items in this category.
To find out how to be listed in this section and seen by thousands, please visit this link Featured Auctions

| Status | Current Items - Current | Buy-It-Now Price | Bids | Ends PDT |
|---|---|---|---|---|
| 📷 | 2GOLD Alpine Bells, medium and small | $3.99 | - | 10/23 06:15 |
| 📷 | Pickard China 1980 CHRISTMAS BELL | $15.00 | - | 10/20 06:07 |
| 📷 | Crown and Rose 1979 Xmas bell PEWTER | $12.00 | - | 10/20 06:06 |
| 📷 | Crown & Rose 1978 PEWTER Christmas bell, #1 | $9.95 | - | 10/20 06:05 |
| 📷 | Kaiser (Germany) 1981 Annual Christmas Bell | $12.00 | - | 10/20 06:05 |
| 📷 | Kaiser 1980 Christmas Bell in White Bisque | $12.00 | - | 10/20 06:05 |
| 📷 | Kaiser (Germany) 1979 Annual Christmas Bell | $8.00 | - | 10/20 06:04 |
| 📷 | KAISER Cobalt Blue 1978 Xmas bell, Germany | $8.00 | - | 10/20 06:04 |
| 📷 | Three Bell(s) Some Collectible; Low Price | $5.00 | - | 10/20 06:03 |
| 📷 | Large Crystal Bell with Four Women | $9.99 | - | 10/20 04:47 |

518 — (points to row)
514 — (points to last row)

Description

I HAVE A BENNINGTON POTTERY SHACK TRAY IT IS MARKED ON BACK. IT IS IN MINT

Free Honesty Counters Image Hosting. Listing Tools and Message Boards

Bidding

BENNINGTON POTTERY TRAY
Item #430507896

Opening bid:        $8.99
Your maximum bid: [ ]
*(Minimum bid: $8.99)*

520      [ Review bid ]

eBay will bid on your behalf up to your maximum bid, which is kept secret from other this is called proxy bidding.
Your bid or purchase is a contract - Buy or place a bid only if you're serious about the item. If you are the winning bidder, you will enter into a legally binding contract to purchase the item from the seller.
Buy It Now no longer available - This item was listed with a Buy It Now price which is no longer available since bidding has started. Learn more

How to Bid
1. Register to bid - if you haven't already. It's free!
2. Learn about this seller - read feedback comments left by others.
3. Know the details - read the item description and payment & shipping terms closely.
4. If you have questions - contact the seller inwinning before you bid.
5. Place your bid!

eBay purchases are insured.

Buy It Now Price:    $52.00

Your User ID: [ ]
You can also use your email address.

504

Your Password: [ ]
Forgot your password?

Save time by signing in. (You may also sign in securely).

[ Buy It Now ]   On the next page, you'll be asked for credit card or alternative verification if your card is not already on file with us.
Your credit card will not be charged.

Your purchase is a contract - Buy only if you're serious about the item. You will enter into a legally binding contract to purchase the item from the seller.

FIG. 9

METHOD AND SYSTEM TO ENABLE A FIXED PRICE PURCHASE WITHIN A ONLINE AUCTION ENVIRONMENT

This application claims priority from the provisional application 60/242,729 entitled METHOD AND SYSTEM TO PROVIDE AN AUCTION TRANSACTION PROCESS AND A FIXED-PRICE TRANSACTION PROCESS VIA A NETWORK-BASED COMMERCE FACILITY and filed on Oct. 23, 2000, which is incorporated herein by reference.

FIELD OF THE INVENTION

The present invention relates generally to the field of e-commerce and, more specifically, to a pre-auction seller determined price for an Internet-based auction facility.

BACKGROUND OF THE INVENTION

Many Internet-based auction facilities have developed in the past several years. Through Internet-based auction facilities, potential sellers can enter information about their product or service for potential buyers to bid on. The information submitted by potential sellers is then organized and stored by the Internet-based auction facility. Potential buyers can search through the organized seller information to find products or services they wish to bid on.

Once a buyer locates an item to bid on, the buyer can compete with other buyers for the item by submitting bids during a specified auction time period. At the end of the specified auction time period, the highest bid buyer is notified and the transaction between the seller and the highest bid buyer is facilitated.

While the current Internet-based auction facility works well for some items, there are several disadvantages. For example, many items in an Internet-based auction facility have at most one bid during the specified auction time. An interested buyer must sometimes wait days for an auction to end even though his bid is the only bid received. Also, there are many potential buyers who don't like auction formats.

SUMMARY OF THE INVENTION

According to one aspect of the present invention there is provided an auction method to present an auction purchase process and a fixed price purchase process for purchasing a seller's offering by a buyer. Upon receipt of a bid from a buyer, the fixed price purchase process for the item bid on is terminated and only the auction purchase process is available for the duration of the auction.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 illustrates an exemplary buyer interface to facilitate a buyer in locating items to purchase or bid on.

FIG. 9 illustrates an exemplary buyer interface used to receive buyer information including an indication to use the fixed-price purchase process or the auction purchase process.

DETAILED DESCRIPTION

A method and system for providing an option to sell and buy at a pre-auction seller determined price in an Internet-based auction facility are described. In the following description, for purposes of explanation, numerous specific details are set forth in order to provide a thorough understanding of the present invention. It will be evident, however, to one skilled in the art that the present invention may be practiced without these specific details.

TERMINOLOGY

For the purposes of the present specification, the term "transaction" shall be taken to include any communications between two or more entities and shall be construed to include, but not be limited to, commercial transactions including sale and purchase transactions, auctions and the like.

TRANSACTION FACILITY

Figure 1:
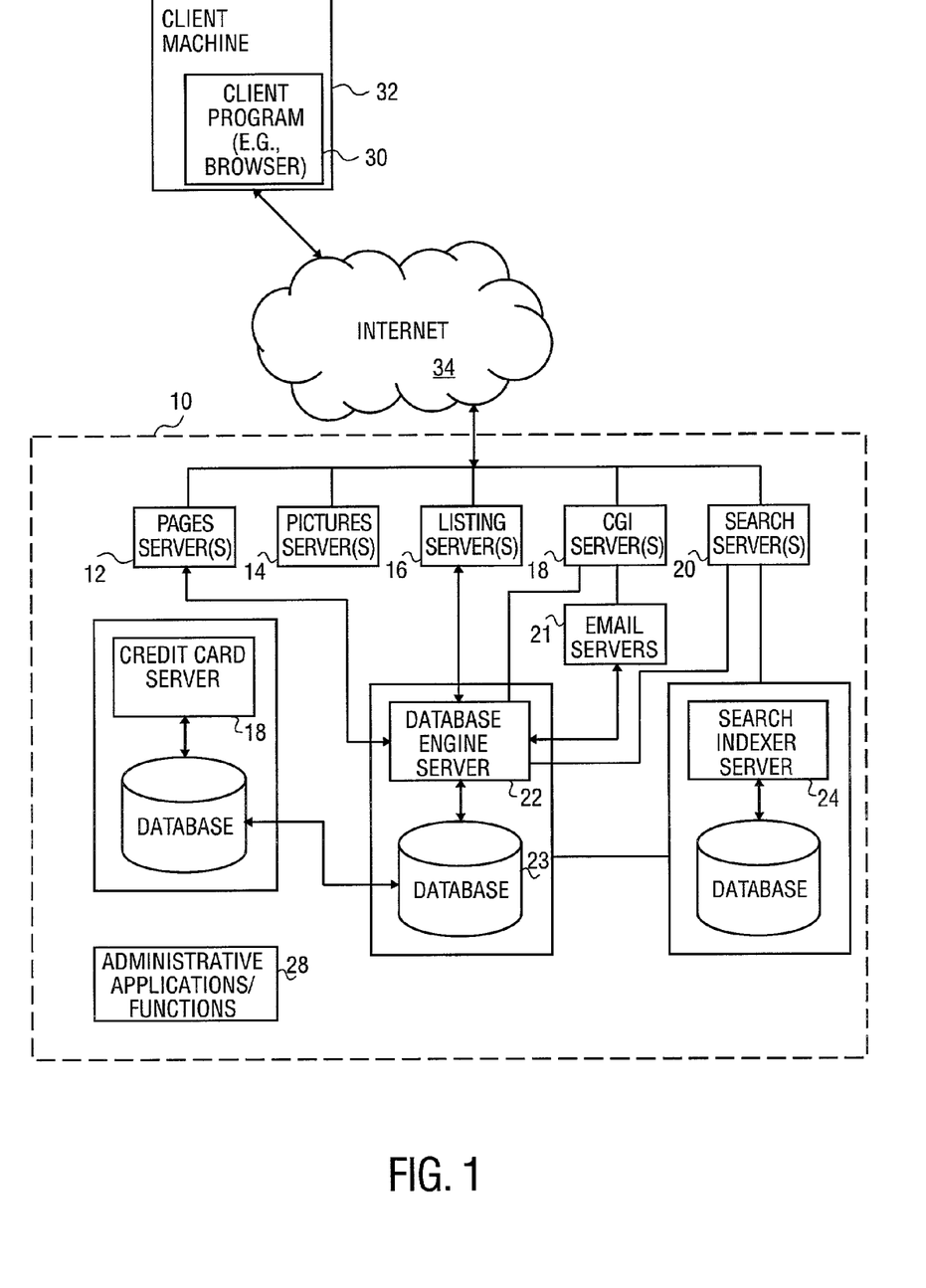
FIG. 1 is a block diagram illustrating an exemplary network-based transaction facility in the form of an Internet-based auction facility
Figure 2:
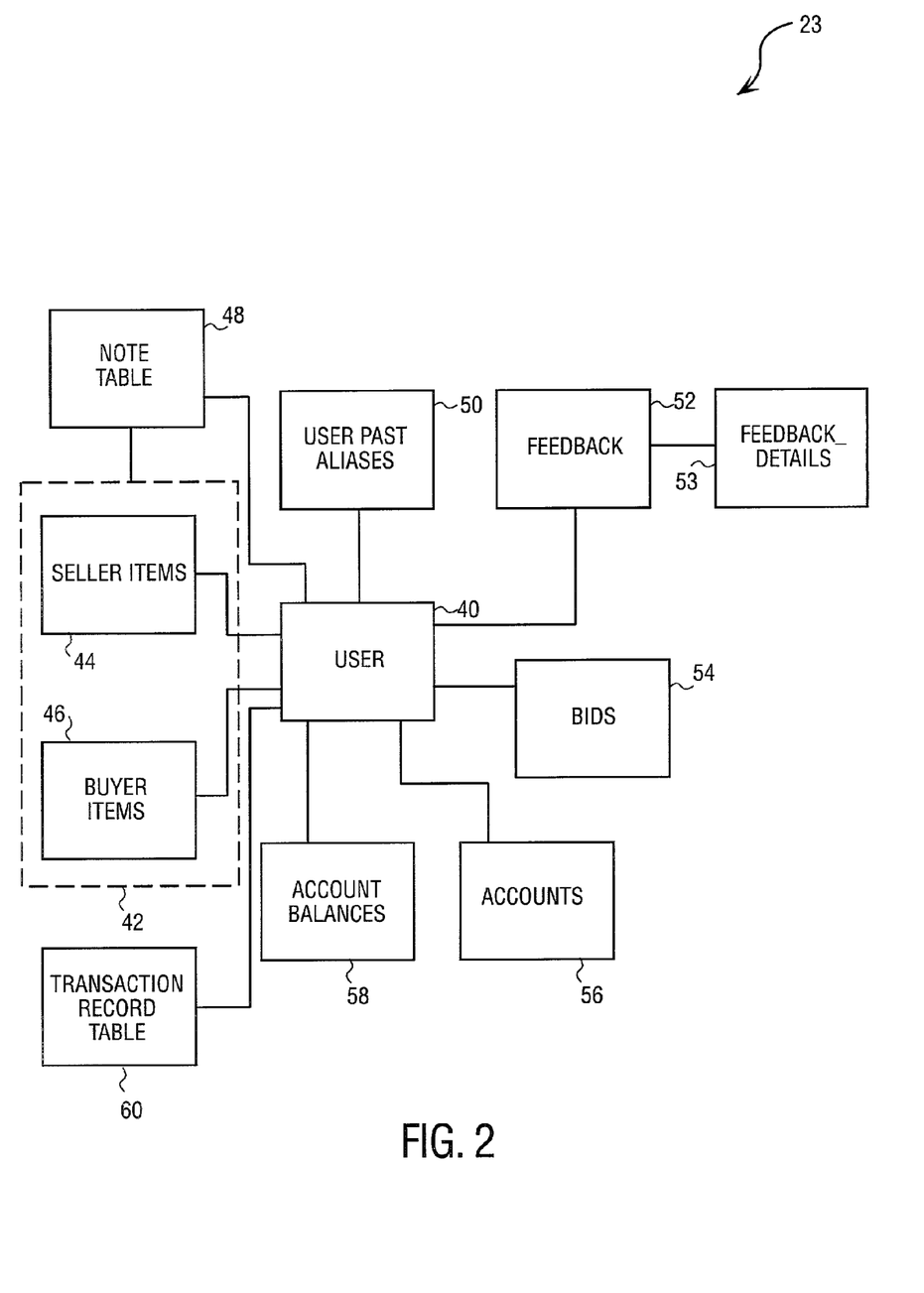
FIG. 2 is a database diagram illustrating an exemplary database for the transaction facility.

To better understand the invention, an embodiment of an electronic transaction facility is shown in FIGS. 1 and 2.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities. It will also be appreciated by those skilled in the art that the invention may be used in auction facilities of other architectures. The instructions stored in the auction facility (which can be executed by a processor) can be stored on a machine-readable medium including, but not limited to read only memory (ROM), random access memory (RAM), magnetic disk storage media, optical storage media, flash memory devices, or electrical, optical, acoustical or other form of propagated signals.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of auction facility 10, and search servers 20 that handle search requests to the auction facility 10. E-mail servers 21 provide, inter alia, automated e-mail communications to users of the auction facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond Washington) that executes on a client machine 32 and accesses the auction facility 10 via a network such as, for example, the Internet 34. Other examples of networks that a client may utilize to access the auction facility 10 include a wide area network (WAN), a local area network (LAN), a wireless network (e.g. a cellular network), or the Plain Old Telephone Service (POTS) (or PSTN) network.

DATABASE STRUCTURE

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of blocks in an block-oriented database. While FIG. 2 shows one embodiment of a database, it will be appreciated by those skilled in the art that the invention can be used with other database structures.

Central to the database 23 is a user table 40, which contains a record for each user of the auction facility 10. A user may operate as a seller, buyer, or both, within auction facility 10. The database 23 also includes item tables 42 that may be linked to the user table 40. Specifically, the item tables 42 include a seller items table 44 and a buyer items table 46. A user record in the user table 40 may be linked to multiple items that are being, or have been auctioned via the auction facility 10. A link indicates whether the user is a seller or a buyer with respect to items for which records exist within the items tables 42. While offerings by the seller are referred to as "items" in the specification, "items" includes any product or service offered by the seller. The database 23 also includes a note table 48 populated with note records that may be linked to one or more item records within the item tables 42 and/or to one or more user records within the user table 40. Each note record within the note table 48 may include, inter alia, a comment, description, history or other information pertaining to an item being auctioned via the auction facility 10 or to a user of the auction facility 10.

A number of other tables are also shown to be linked to the user table 40, namely a user past aliases table 50, a feedback table 52, a bids table 54, an accounts table 56, and an account balances table 58.

Figure 3:
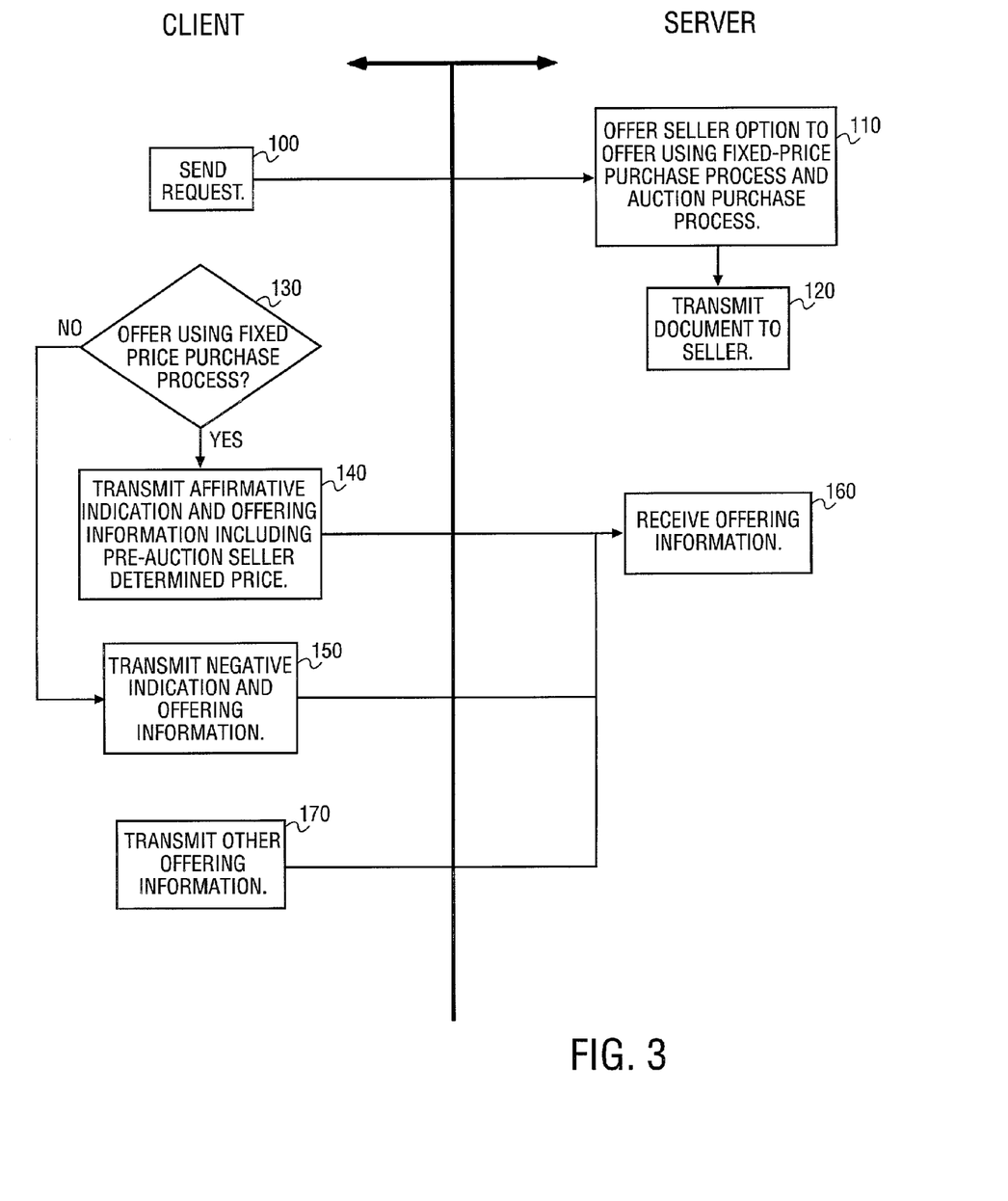
FIG. 3 is a flow chart illustrating an exemplary method of receiving offering information from a seller including whether to offer the item at a pre-auction seller determined price.

FIG. 3 shows a flowchart for an exemplary embodiment of a method to acquire offering information from a seller. The seller issues a listing request (block 100) to the auction facility 10, and the auction facility generates instructions (block 110) offering the seller the option to sell his item using an auction purchase process option and/or a fixed-price purchase process option. After the instructions have been transmitted (block 120), and a page server 12 (see FIG. 1) displays the instructions, the seller decides whether to offer a buyer the chance to buy the offering at a pre-auction seller determined price in a fixed-price purchase process. The seller transmits a purchase process indicator by either an affirmative (block 140) or a negative (block 150). The server can receive and store in note table 48 of database 23 (FIG. 2) this information for later use (block 160). The seller also transmits other offering information, such as a description, picture, reserve price, and contact information to be collected and stored in note table 48 of database 23 (see FIG. 2) (block 160). Optionally, if the seller sends a pre-auction seller determined price that is less than the reserve price he or she sends, the seller can be notified of an error.

Figure 4:
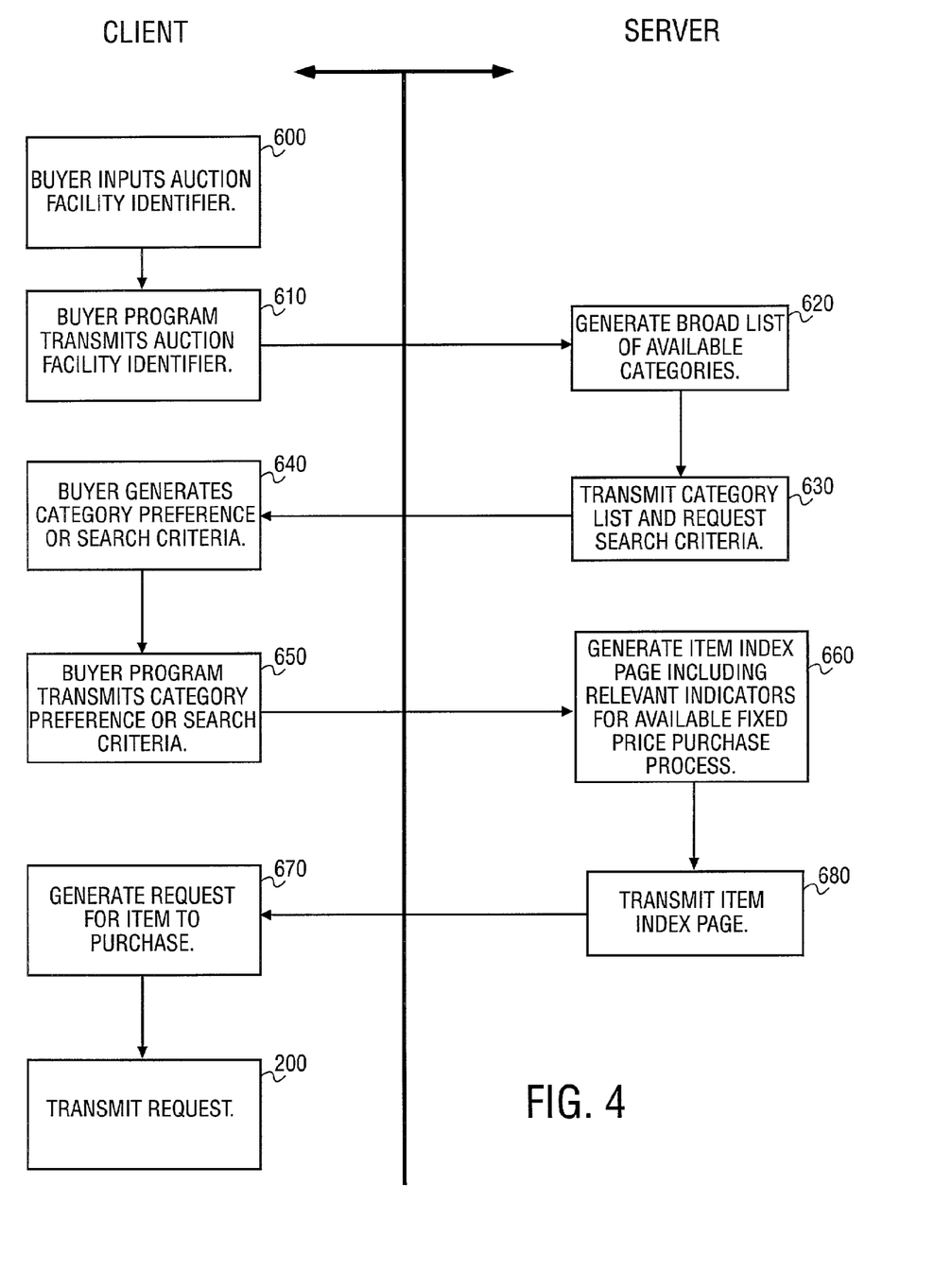
FIG. 4 is a flow chart illustrating an exemplary method of generating a buyer preferred index page using category preferences or search criteria.

FIG. 4 shows a flow chart showing one embodiment of a buyer's interaction with the Internet-based auction facility. The buyer locates the site by inputting the auction facility identifier (block 600) into the client program 30 running on client machine 32 (see FIG. 2) which transmits the auction facility identifier (block 610) through the Internet 34 (See FIG. 1). The Internet-based auction facility receives the transmission and (block 620) a listing server 16 (see FIG. 1) generates a broad list of available categories of items stored in items table 42 (see FIG. 2) for the buyer to select from. The auction facility 10 (block 630) transmits the category list and transmits an interface, which can be presented by a page server 12 (see FIG. 1), to allow the buyer to enter search criteria which may be independent of the category list. The buyer selects a category preference from the category list or generates a search criteria (block 640). The buyer then transmits (block 650) the category preference or search criteria, again, through the Internet 34 (see FIG. 1). Upon receipt of the category preference or search criteria, the auction facility uses a search server 20 (see FIG. 1) to generate an item index page of relevant offerings including visual indicators displayed in respect to items in which the seller is allowing a buyer to buyer the item at a pre-auction seller determined price (block 660). The item index page is transmitted to the buyer (block 680). After receiving the item index page (block 670), the buyer generates a request for an item to purchase or bid on. Picture servers 14 (see FIG. 1) can also be used to show the buyer pictures (if available) of the item. The buyer's request is then transmitted (block 200).

Figure 5A:
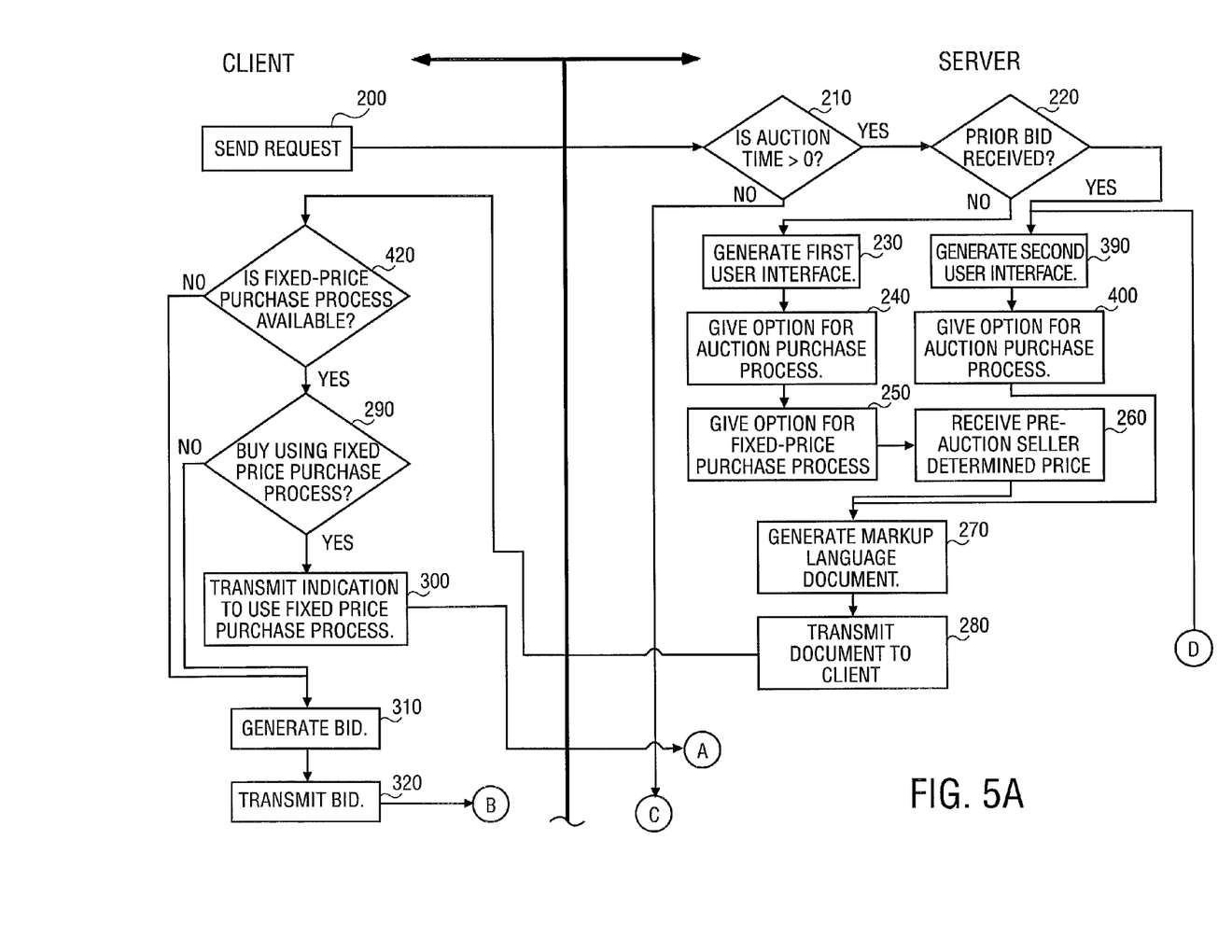
FIG. 5 is a flow chart illustrating an exemplary method of displaying user interfaces for and conducting an auction facility with an auction purchase process and optionally a fixed-price purchase process.
Figure 5B:
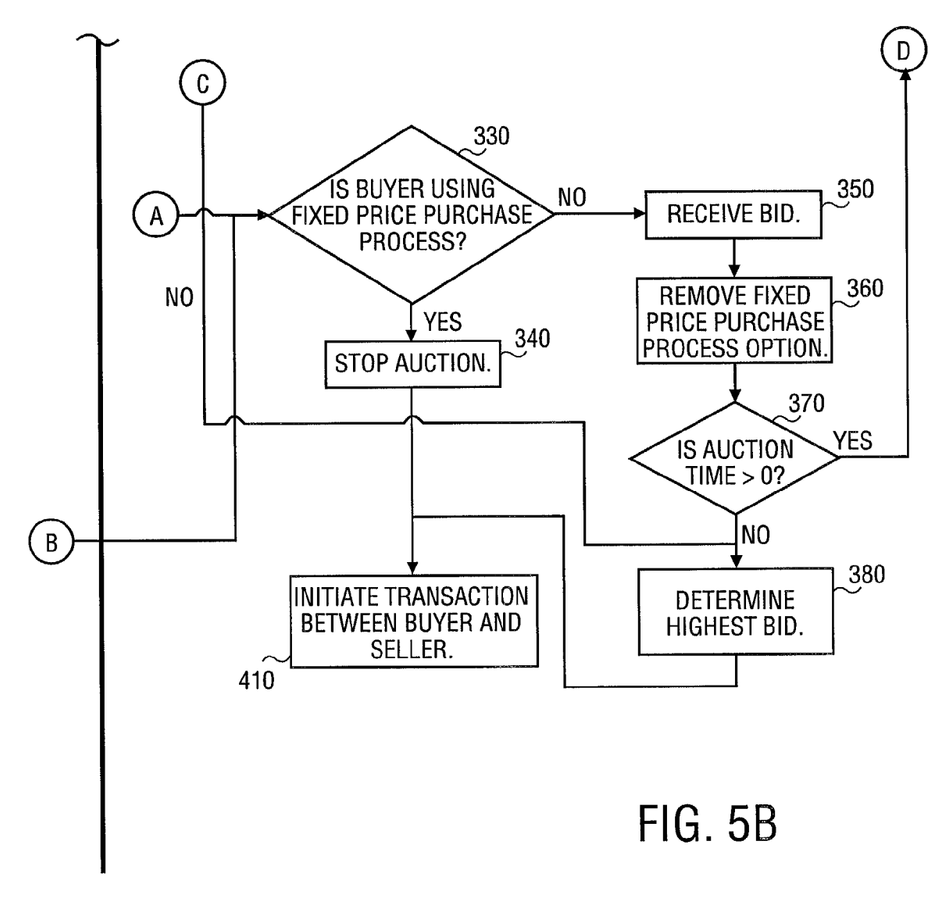

FIG. 5 shows a flow chart illustrating how the client interfaces with the auction facility, located on a first computer system, when a pre-auction seller determined price is an alternative option to bidding. After the facility receives the buyer's request (block 200), decision block 210 decides if there is still time remaining in the item's auction (item requested by the buyer). If a predetermine period of time has passed, the buyer will not be allowed to place a bid or buy at the pre-auction seller determined price. Instead the auction will end and the highest bidder (if there is one) will be determined (block 380). If there is time remaining, then the determination is made in decision block 220 whether a prior bid has been received. If a prior bid has been received, then the pre-auction seller determined price is no longer available to the buyer and the buyer's only option is to bid. If no prior bid has been received, and the item has a pre-auction seller determined price available, a first user interface will be created (block 230). The auction facility 10 will make the typical auction purchase process available through the user interface (block 240) and will make the fixed price purchase process available to the client (block 250). The pre-auction seller determined price is retrieved for the user interface (block 260). The first user interface is converted into a markup language document suitable for viewing by the buyer (block 270). The generated markup language document is then transmitted for viewing by the buyer on a second computer system using page servers 12 on the first computer system (block 280) (see FIG. 1).

If, at decision block 220, it is determined that an initial bid value has been received, a second user interface will be generated (block 390). The typical auction purchase process is then made available through the user interface (block 400). The second user interface is converted into a markup language document suitable for viewing by the buyer (block 270). The generated markup language document is then transmitted to the buyer (block 280).

After the markup language document has been transmitted to the buyer, a determination is made at decision block 420, based on the transmitted markup language document whether the fixed price purchase process is available to the buyer. If the fixed price purchase process is available to the buyer, the buyer then makes a determination at decision block 290 whether to buy the item at the pre-auction seller determined price or whether to bid on the item. If the buyer chooses to purchase the item using the fixed price purchase process, his indication to buy at the pre-auction seller determined price is transmitted to the auction facility.

If the fixed price purchase process is not available to the buyer (as determined in decision block 420) or fixed price purchase process is available, but the buyer chooses not to use the fixed price purchase process, the buyer generates a bid (block 310). The bid is then transmitted to the auction facility (block 320).

Upon receiving a transmission from the buyer, a determination is made at decision block 330 whether the buyer has chosen the fixed price purchase process. If the buyer has chosen the fixed price purchase process, the auction is stopped (block 340) and a transaction is initiated between the buyer and the seller (block 410). Optionally, the auction facility can check the buyer's credit before stopping the auction.

If the buyer has not opted to use the fixed price purchase process, as determined by the auction facility at decision block 330 (either because it wasn't available or he or she preferred to place a bid instead), the bid is received (block 350). Optionally, if the bid is greater than the pre-auction seller determined price (and the fixed price purchase process is still available), the auction facility may invite the buyer to use the fixed price purchase process. Upon receipt of the bid, the fixed price purchase process option is removed (block 360) and a determination is made at decision block 370 to see if there is any time remaining in the auction. If there is time remaining in the auction, bids can be received and processed in the above manner until there is no more time remaining in the auction. However, if there is no more time remaining in the auction, the highest valid bid is determined from the received bids (block 380), and a transaction is initiated between the highest bidder and the seller (block 410).

Figure 6:
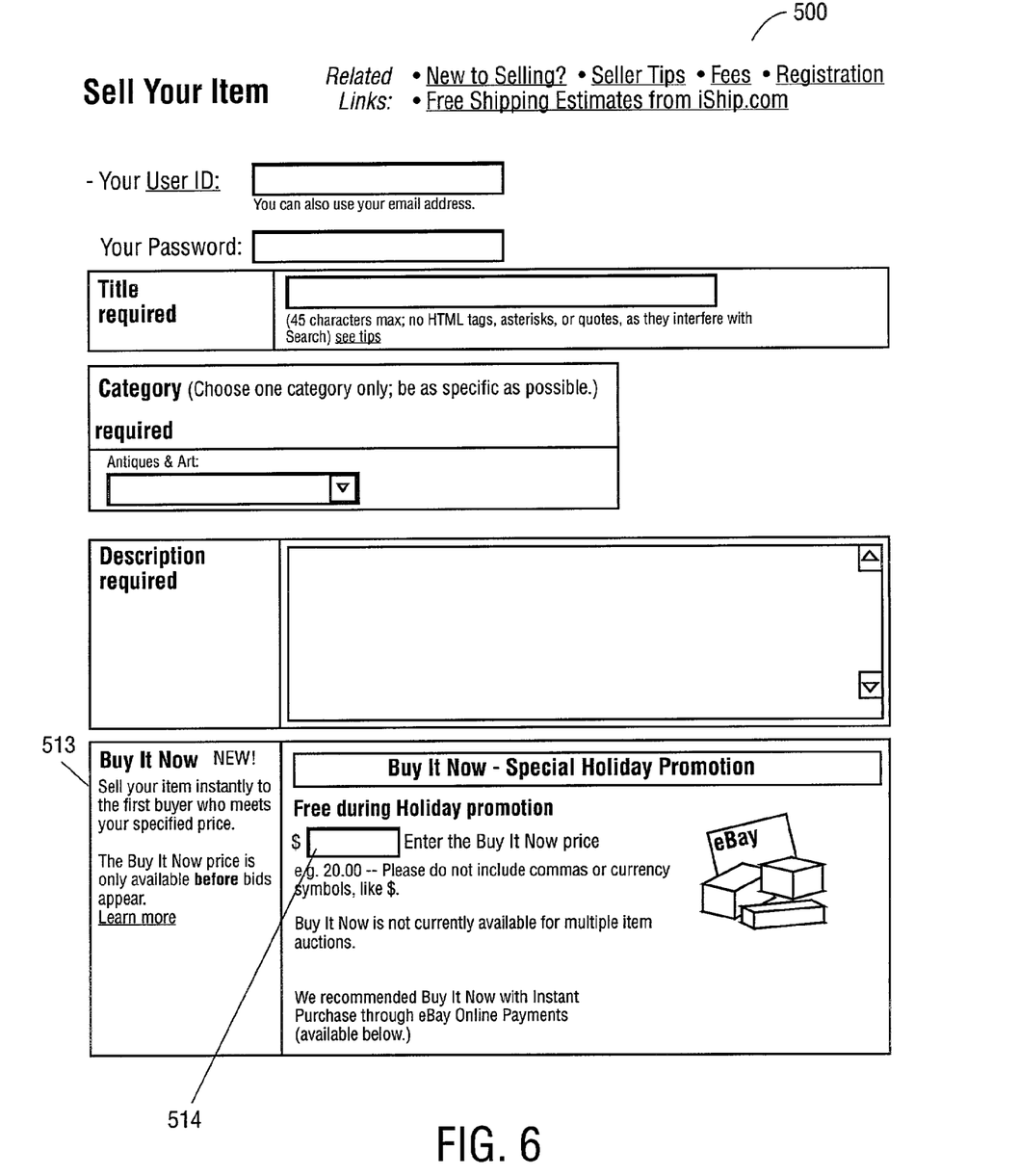
FIG. 6 illustrates an exemplary seller interface to receive information on seller's offerings.

FIG. 6 provides an exemplary embodiment of the user interface 500 created at block 110 in FIG. 3 to relay offering options to the seller and collect information on the seller's item. The user interface 500 includes a description (513) that describes an exemplary "Buy It Now" feature that provides the seller the option to allow a buyer to buy the item at a pre-auction seller determined price 514.

Figure 7:
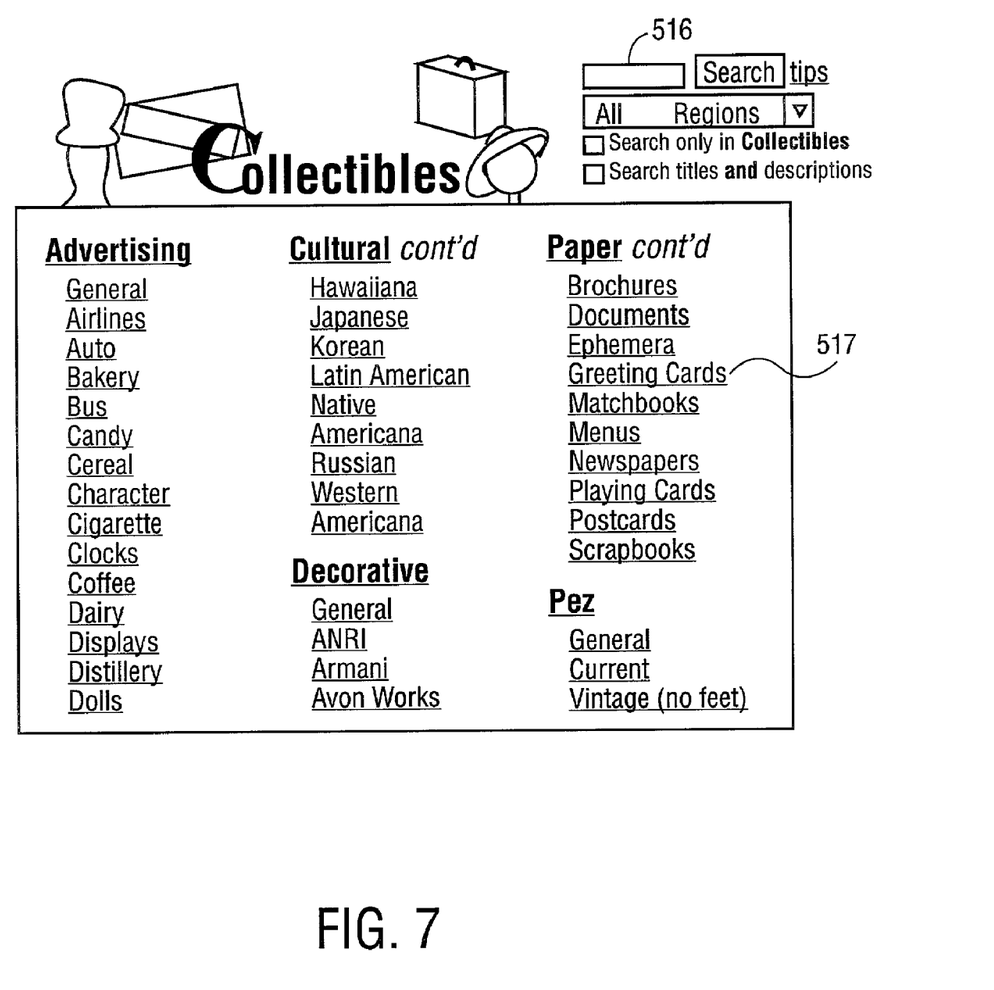

FIG. 7 provides an exemplary embodiment of the category list 517 and search criteria request generated by object 620 in FIG. 4. A buyer can generate search criteria (block 640) by typing the search criteria (block 516).

Figure 8:
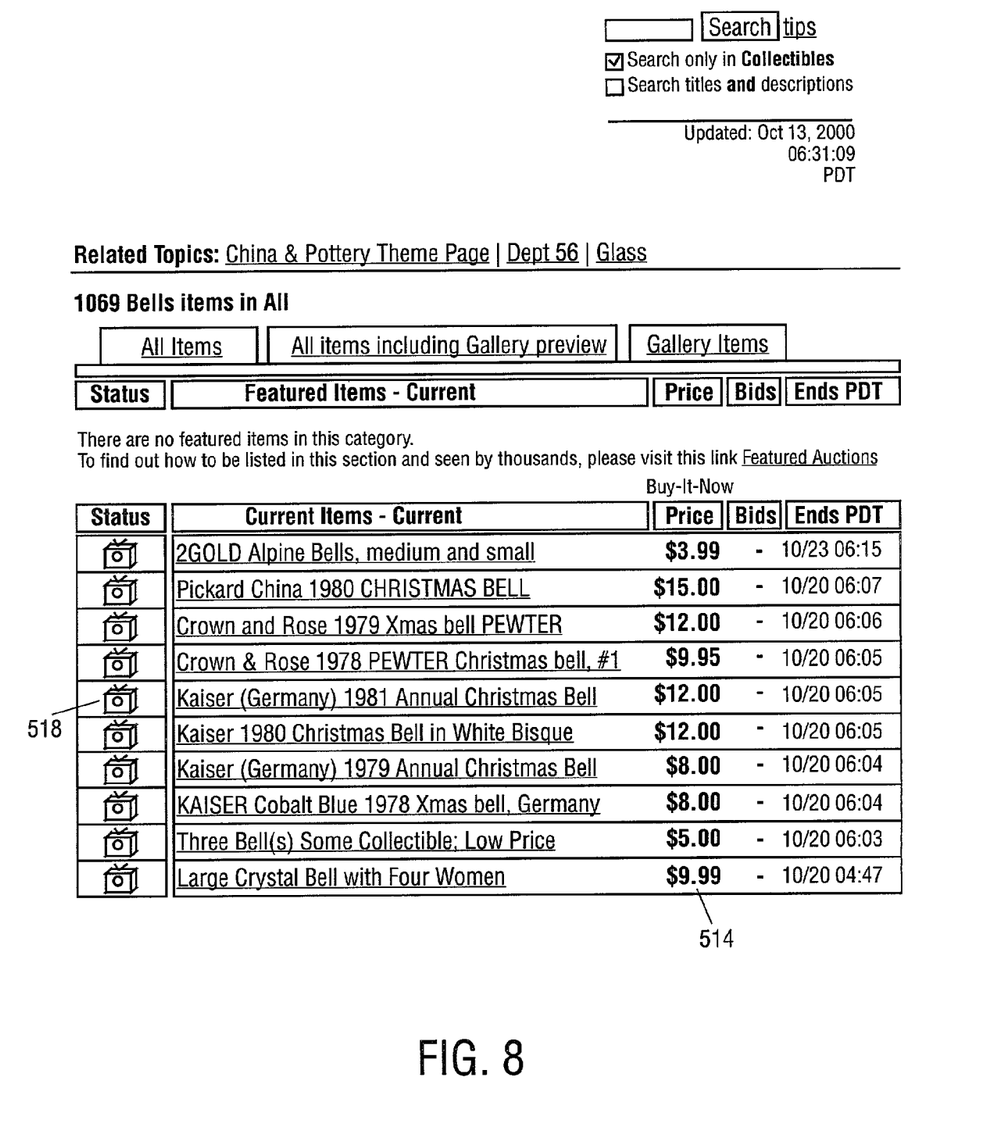
FIG. 8 illustrates an exemplary item list generated in response to buyer's category selection or search criteria provided in the user interface of FIG. 7.

FIG. 8 provides an exemplary embodiment of the item index page generated at block 660 in FIG. 4. A possible placement of the fixed-price purchase process availability icon 518 is shown next to the item. Also displayed in the embodiment of the item index page is a list of prices 514 which could either be the current bid or the pre-auction seller determined price if available.

FIG. 9 shows an exemplary embodiment of the markup language document generated at block 270 in FIG. 5. Regular auction panel 503 is generated (blocks 240 and 400). Fixed price purchase process panel 504 is generated (block 250) in FIG. 5. The buyer can submit a bid 520 or, depending on the availability of the fixed price purchase process, can start the fixed price purchase process in panel 504.

Thus a method and system for providing an option to sell and buy at a pre-auction seller determined price in an Internet-based auction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed:

1. A computer implemented method of facilitating an electronic transaction, the computer implemented method comprising:

presenting, via a first computer system, both an auction purchase process and a fixed price purchase process for purchase of an offering to a buyer; and responsive to receipt of a bid from the buyer as part of the auction purchase process, removing the presentation of the fixed price purchase process.

2. The computer implemented method of claim 1 wherein the presenting includes generating a first user interface identifying both the auction purchase process and the fixed price purchase process to the buyer.

3. The computer implemented method of claim 2 wherein the first user interface is a markup language document generated at the first computer system, and wherein the presenting includes communicating the markup language document from the first computer system to a second computer system via a network.

4. The computer implemented method of claim 1 wherein removing the presentation includes generating a second user interface tat identifies only the auction purchase process to the buyer.

5. The computer implemented method of claim 1 wherein the auction purchase process is presented with an initial bid value and wherein the fixed price purchase option is presented with a seller determined price.

6. The computer implemented method of claim 1 including, responsive to the receipt of the bid from the buyer, as part of the auction process, maintaining only the auction purchase process for a predetermined period of time to receive further bids from further buyers.

7. The computer implemented method of claim 6 including, at the conclusion of the predetermined time period, establishing the electronic transaction between a winning buyer, who submitted a highest valid bid, and a seller.

8. The computer implemented method of claim 1 including presenting to a seller a purchase process option to sell the offering by both the auction and the fixed price purchase processes, and receiving a purchase process indication from the seller responsive to the presentation of the purchase process option.

9. A computer implemented method comprising:
receiving, at a computer system, selling information for an offering from a seller including an offering description, an indication whether to allow a buyer a chance to buy the offering at a seller determined price, and if the indication to allow the buyer the chance to buy the offering at the seller determined price is affirmative, the seller determined price;
receiving purchase information from the buyer including at least one of an affirmative indication to purchase the offering at the seller determined price if a seller has given affirmative indication to allow the buyer the chance to buy the offering at the seller determined price and a bid the buyer will buy the offering at; and
determining a successful buyer comprising:
if an affinnative indication to purchase the offering at the seller determined price is received from the buyer and no bids have been received for the offering, the buyer, having given affirmative indication, is the successful buyer;
if a first bid is received from the buyer then a buyer from which the highest bid is received is the successful buyer. if the seller gives the affirmative indication to allow the buyer the chance to buy the offering at the seller determined price, the chance to buy the offering at the seller determined price terminates upon receipt of the first bid from the first buyer.

10. The computer implemented method of claim 9 further comprising requesting additional bidding information from the buyer giving the affirmative indication to purchase the offering at the seller determined price if the additional bidding information has not been received before; the additional bidding information used to determine whether to accept the affirmative indication to purchase the offering at the seller determined price.

11. The computer implemented method of claim 9, wherein if the selling information received from the seller includes a reserve price, generating a notification for the seller to communicate an error indication if the reserve price is not equal to or less than the seller determined price if the seller gives the affirmative indication to allow the buyer the chance to buy the offering at the seller determined price.

12. The computer implemented method of claim 9, wherein if the seller gives the affirmative indication to allow the buyer the chance to buy the offering at the seller determined price, a desired bid of the first buyer is compared to the seller determined price and if the desired bid is greater than the seller determined price, a message is sent to the first buyer inviting the first buyer to give the affirmative indication to purchase the offering at the seller determined price before the first buyer's desired bid is received.

13. The computer implemented method of claim 9, wherein if the seller gives the affirmative indication to allow the buyer the chance to buy the offering at the seller determined price, a desired bid of the first buyer is compared to the seller determined price and if the desired bid is less than the seller determined price, a message is sent to the first buyer inviting the first buyer to give affirmative indication to purchase the offering at the seller determined price before the desired bid is received.

14. The computer implemented method of claim 9 further comprising presenting a part of the selling information to a buyer on a computer screen.

15. The computer implemented method of claim 14 further comprising displaying a visual indicator in association with the selling information if the seller of the offering has given the affirmative indication to allow the buyer the chance to buy the offering at the seller determined price.

16. The computer implemented method of claim 15 further comprising removing the visual indicator after the first bid is received on that offering from a first buyer.

17. The computer implemented method of claim 15 further comprising generating a user interface to receive the affirmative indication to purchase the offering which the seller has given the affirmative indication to allow the buyer to purchase at the seller determined price.

18. A computer implemented method comprising:
receiving, at a computer system, offering information from a plurality of sellers at a computer-based transaction facility;
organizing the offering information into predetermined categories;
receiving a category selection from a buyer at the computer-based transaction facility;
automatically displaying a list of offering information in the selected category, the offering information including a plurality offerings including a first offering that is associated with a visual indicator if a seller of the first offering has given affirmative indication to allow a buyer a chance to buy the first offering at a seller determined price; and
removing the visual indicator after a first bid is received on the first offering from a first buyer.

19. The computer implemented method of claim 18 further comprising removing the offering information for the offering if a seller has given an affirmative indication to allow the first buyer a chance to purchase the first offering at a seller determined price and an affirmative indication to purchase the offering at the seller determined price has been received.

20. A tangible machine readable medium storing a set of instructions that, when executed by a machine, cause the machine to:
present, via a first computer system, both an auction purchase process and a fixed price purchase process for purchase of an offering to a buyer; and
responsive to receipt of a bid from the buyer as part of the auction purchase process, remove the presentation of the fixed price purchase process.

* * * * *

UNITED STATES PATENT AND TRADEMARK OFFICE
CERTIFICATE OF CORRECTION

PATENT NO. : 7,340,429 B2  Page 1 of 1
APPLICATION NO. : 09/820574
DATED : March 4, 2008
INVENTOR(S) : Maltzman It is certified that error appears in the above-identified patent and that said Letters Patent is hereby corrected as shown below:

Title page, Item (54), delete "A" and insert -- An --, therefor.

Page 2, Item (56) under "Other Publications", in column 2, line 7, delete "Aucent:" and insert -- Aucnet: --, therefor.

Page 3, Item (56) under "Other Publications", in column 1, line 12, delete "persistend" and insert -- persistent --, therefor.

In column 1, line 2, delete "A" and insert -- An --, therefor.

In column 1, line 65, after "facility" insert -- . --.

In column 4, line 36, after "to" delete "buyer" and insert -- buy --, therefor.

In column 6, line 47, in Claim 4, delete "tat" and insert -- that --, therefor.

In column 7, line 16, in Claim 9, delete "affinnative" and insert -- affirmative --, therefor.

In column 7, line 23, in Claim 9, after "buyer" delete "." and insert -- , --, therefor.

In column 7, line 51, in Claim 12, after "the" delete "first buyer's".

Signed and Sealed this

Twenty-fourth Day of June, 2008

JON W. DUDAS
*Director of the United States Patent and Trademark Office*